US012649094B2

(12) United States Patent
McKeithan, Jr. et al.

(10) Patent No.: US 12,649,094 B2
(45) Date of Patent: Jun. 9, 2026

(54) SYSTEM AND METHOD OF REMOVING MATERIAL FROM A KNOB OF A BASEBALL BAT

(71) Applicants: Jerry R McKeithan, Jr., Arden, NC (US); Vimi McKeithan, Arden, NC (US); Joel McKeithan, Arden, NC (US); Timothy McKeithan, Arden, NC (US); Lydia McKeithan, Arden, NC (US); Aaron McKeithan, Arden, NC (US)

(72) Inventors: Jerry R McKeithan, Jr., Arden, NC (US); Vimi McKeithan, Arden, NC (US); Joel McKeithan, Arden, NC (US); Timothy McKeithan, Arden, NC (US); Lydia McKeithan, Arden, NC (US); Aaron McKeithan, Arden, NC (US)

( * ) Notice: Subject to any disclaimer, the term of this patent is extended or adjusted under 35 U.S.C. 154(b) by 208 days.

(21) Appl. No.: 18/203,399

(22) Filed: May 30, 2023

(65) Prior Publication Data

US 2023/0381611 A1 Nov. 30, 2023

Related U.S. Application Data

(60) Provisional application No. 63/397,133, filed on Aug. 11, 2022, provisional application No. 63/346,456, filed on May 27, 2022.

(51) Int. Cl.
*A63B 60/42* (2015.01)
*A63B 59/52* (2015.01)
(Continued)

(52) U.S. Cl.
CPC ............... *A63B 60/42* (2015.10); *B27M 3/22* (2013.01); *A63B 59/52* (2015.10); *A63B 2102/18* (2015.10)

(58) Field of Classification Search
CPC ..... A63B 60/42; A63B 2102/18; A63B 59/52; B27M 3/22
See application file for complete search history.

(56) References Cited

U.S. PATENT DOCUMENTS 4,653,754 A * 3/1987 Cross .................... A63B 60/10 473/568
5,269,177 A * 12/1993 Miggins ................ A63B 60/42 73/65.03
(Continued)

*Primary Examiner* — Joseph B Baldori
*Assistant Examiner* — Christopher Glenn
(74) *Attorney, Agent, or Firm* — Ingram IP Law, P.A.

(57) ABSTRACT

The technology provides a method of reducing injury to a hamate bone for the lower hand while swinging a bat. The method includes determining a relief location for a knob of a wood baseball bat gripped with two hands, one above the other, with a lower hand being proximate to or contacting the knob. The process includes determining a location of a hamate hook on the lower hand, based on an intersection of a Kaplan's cardinal line and an ulnar border of ring line and placing a transferable substance over the hamate hook of the lower hand. A wooden baseball bat is selected and gripped with the grain positioned for a baseball to contact a hard side of a barrel during a swing. A location is identified to create a relief in the knob based on a transfer of the substance corresponding to a location of the hamate hook.

18 Claims, 9 Drawing Sheets

(51) Int. Cl.
*A63B 102/18* (2015.01)
*B27M 3/22* (2006.01)

(56) References Cited

U.S. PATENT DOCUMENTS

| | | | | | |
|---|---|---|---|---|---|
| 6,139,451 | A * | 10/2000 | Hillerich, III | A63B 59/52 | 473/567 |
| 7,820,942 | B1 * | 10/2010 | Lamsfuss | B23K 26/361 | 219/121.85 |
| 2011/0172035 | A1 * | 7/2011 | Gregory | A63B 59/52 | 473/457 |
| 2013/0045823 | A1 * | 2/2013 | Sublett, Sr. | A63B 59/50 | 156/161 |
| 2015/0238832 | A1 * | 8/2015 | Nelson | A63B 59/50 | 473/564 |
| 2015/0273305 | A1 * | 10/2015 | Haro | A63B 59/55 | 473/457 |
| 2016/0166901 | A1 * | 6/2016 | Grady, Jr. | A63B 60/50 | 473/422 |
| 2016/0289480 | A1 * | 10/2016 | Maddalone | A01N 25/18 | |
| 2017/0106261 | A1 * | 4/2017 | DePaoli | A63B 60/14 | |
| 2017/0182387 | A1 * | 6/2017 | Phelan, Jr. | A63B 59/20 | |
| 2019/0117534 | A1 * | 4/2019 | Alimi | A61K 8/25 | |
| 2020/0282281 | A1 * | 9/2020 | Thomas | A63B 21/0557 | |

* cited by examiner

SYSTEM AND METHOD OF REMOVING MATERIAL FROM A KNOB OF A BASEBALL BAT

CROSS-REFERENCE TO RELATED APPLICATION

This application claims priority to U.S. Provisional Application Ser. No. 63/346,456 filed on May 27, 2022 and U.S. Provisional Application Ser. No. 63/397,133 filed on Aug. 11, 2022, the complete disclosures of which are incorporated herein by reference in its entirety.

FIELD OF THE TECHNOLOGY

The present technology broadly relates to reducing injury in sports that require a firm grip on a shaft. More specifically, this technology relates to reducing hand injury in baseball by removing material from a knob to avoid direct contact with a hamate bone.

BACKGROUND OF THE TECHNOLOGY

The hamate bone is one of eight carpal bones located in the human palm. The hamate is a triangular-shaped bone that articulates radially with the capitate bone, proximally with the lunate and triquetrum bones, and distally with the fifth and fourth metacarpals. The hamate bone is composed of a body and a hook (hamulus) and serves as the ulnar border of the distal carpal row. The body of the hamate bone may fracture during a high energy trauma such as a motor vehicle accident or a direct strike from a projectile. The hook of hamate is more commonly fractured than the body and can occur while playing sports that require a firm grip of a shaft, such as in baseball, racket sports, hockey, and golf. Hook of hamate injuries often result from repetitive impact during sporting activities such as when a racket, club, or bat exert a direct force against the hamate bone. The hook of hamate is at risk of injury because it protrudes from its body more superficially into the palm than the other carpal bones. Furthermore, the hook of hamate may be subject to avulsion fractures since it serves as an attachment point for three tendons including the oppenens digiti minimi tendon, the flexor digiti mimimi tendon, and the flexor carpi ulnaris tendon.

BRIEF DESCRIPTION OF THE FIGURES

The technology can be more fully understood by reading the following detailed description together with the accompanying drawings, in which like reference indicators are used to designate like elements. The drawings illustrate several examples of the technology. It should be understood, however, that the technology is not limited to the precise arrangements and configurations shown. In the drawings.

DETAILED DESCRIPTION OF THE TECHNOLOGY

Figure 1:
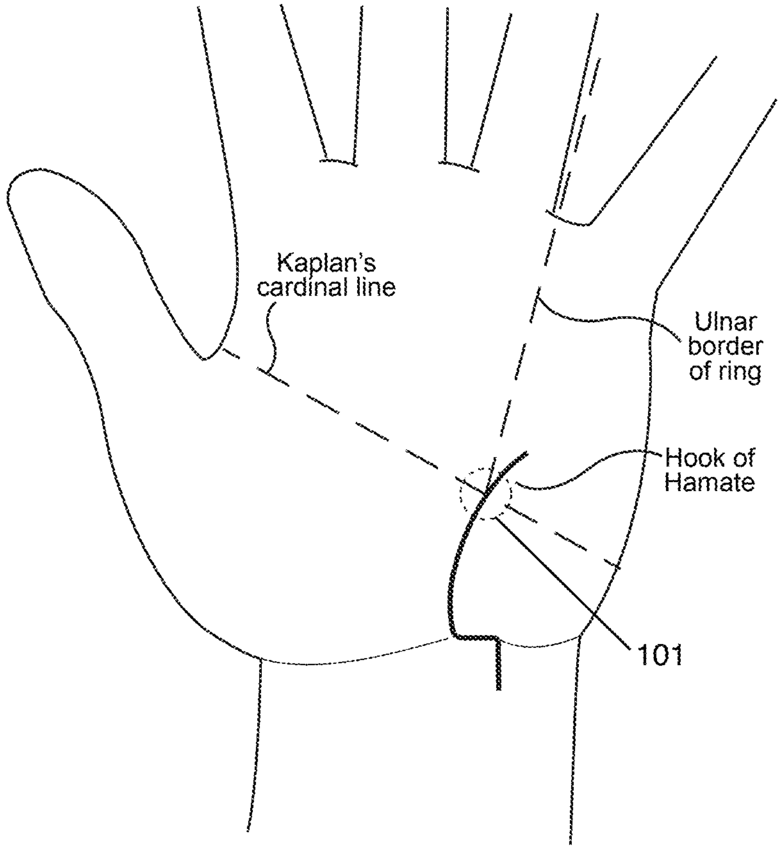
FIG. 1 illustrates a human left hand with markings applied thereto to aid in locating the hook of the hamate bone according to one example of the technology.

It will be readily understood by persons skilled in the art that the present disclosure has broad utility and application. In addition to the specific examples described herein, one of ordinary skill in the art will appreciate that this disclosure supports various adaptations, variations, modifications, and equivalent arrangements.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, methods, procedures, and components have not been described in detail so as not to obscure the related relevant feature being described. Also, the description is not to be considered as limiting the scope of the examples described herein. The drawings are not necessarily to scale and the proportions of certain parts may have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items. The terms "comprising," "including," and "having" are used interchangeably in this disclosure. The terms "comprising," "including," and "having" mean to include, but are not necessarily limited to the things so described. The terms "connected" and "coupled" can be such that the objects are permanently connected or releasably connected. The term "substantially" is defined to be essentially conforming to the thing that it "substantially" modifies, such that the thing need not be exact. For example, substantially 2 inches (2") means that the dimension may include a slight variation.

Baseball bats generally include an overall length, a knob provided at a first end proximate to a grip area, a barrel, and a barrel end provided at a second end that is opposite to the first end. Players grip baseball bats using two hands, one above the other, with a lower hand proximate to or contacting the knob and an upper hand abutting the lower hand. According to one example, players may grip a baseball bat so that the knob exerts a direct force against the hamate bone of the lower hand while swinging a bat. A common injury for baseball players of all levels is bruising or fracturing the hook of the hamate bone while swinging the bat. For example, the hook of the hamate bone may fracture during a bat swing when the knob of a baseball bat "digs" into an area of the hand/wrist that includes the hamate bone.

Figure 2:
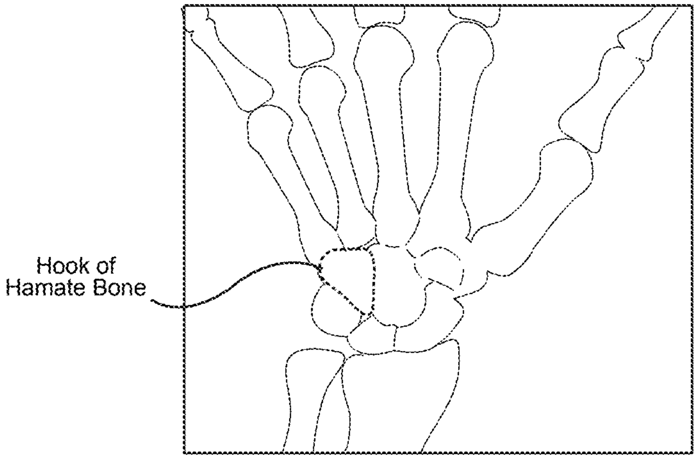
FIG. 2 illustrates an x-ray image of a human right hand showing a location of the hook of the hamate bone relative to other carpal bones.
Figure 3:
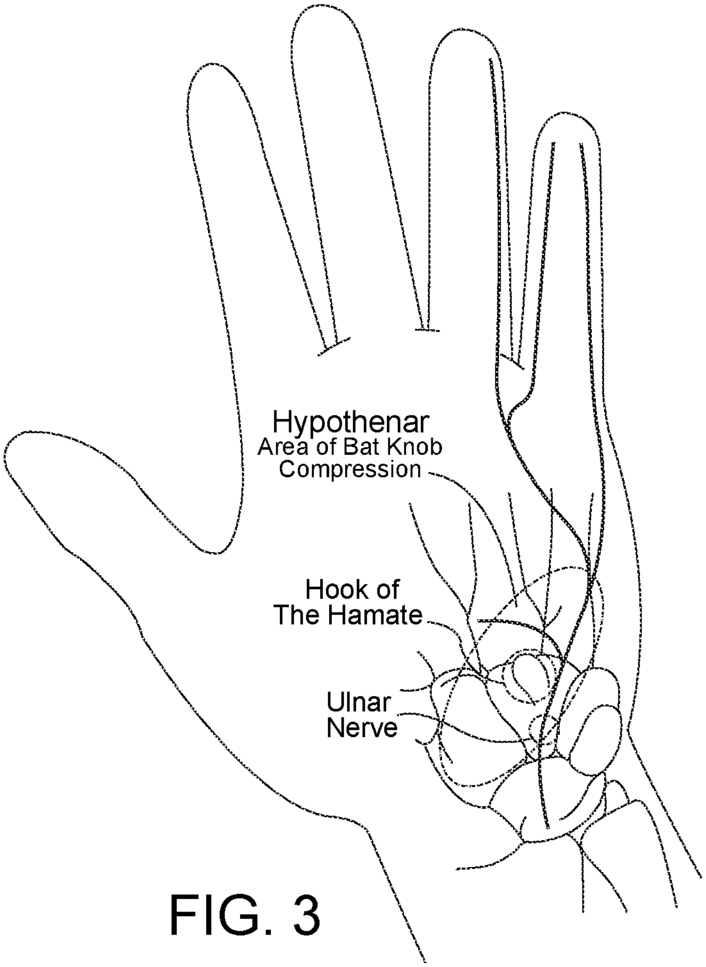
FIG. 3 illustrates a human left hand with markings applied thereto that indicate an area of knob compression relative to the hook of the hamate bone according to one example of the technology.
Figure 4:
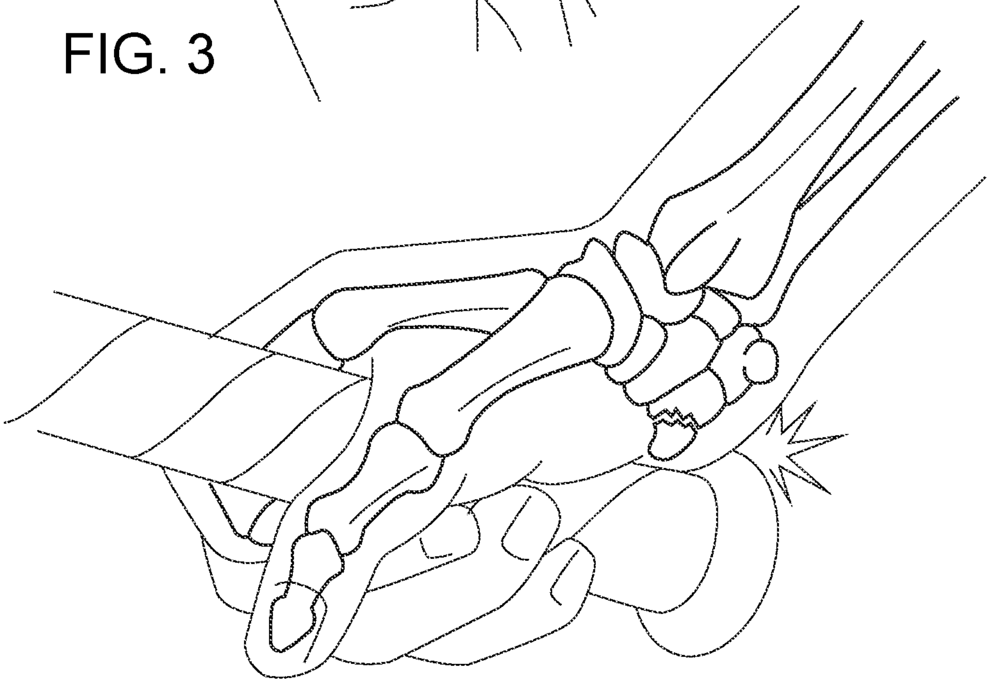
FIG. 4 illustrates a human right hand gripping a baseball bat, which exerts a direct force against the hamate bone.

FIG. 1 illustrates a human left hand with markings applied thereto to aid in locating the hook of the hamate bone according to one example of the technology. A first line called Kaplan's cardinal line extends from an area of the thumb, while a second line called the ulnar border of ring line extends from the ring finger. FIG. 1 illustrates that an intersection between the Kaplan cardinal line and the ulnar border of ring line provide a physical location of the hook of the hamate bone. FIG. 2 illustrates an x-ray image of a human right hand showing a location of the hook of the hamate bone relative to other carpal bones. FIG. 3 illustrates a human left hand with markings applied thereto that indicate an area of knob compression relative to the hook of the hamate bone. For example, FIG. 3 illustrates a dashed oval area that corresponds to a hypothenar area of bat knob compression in which the hook of hamate bone is situated directly. FIG. 3 further illustrates the ulnar nerve, which is also within the oval area that corresponds to a hypothenar area of bat knob compression. FIG. 4 illustrates a human right hand gripping a baseball bat, which exerts a direct force against the hamate bone.

Figure 5A:
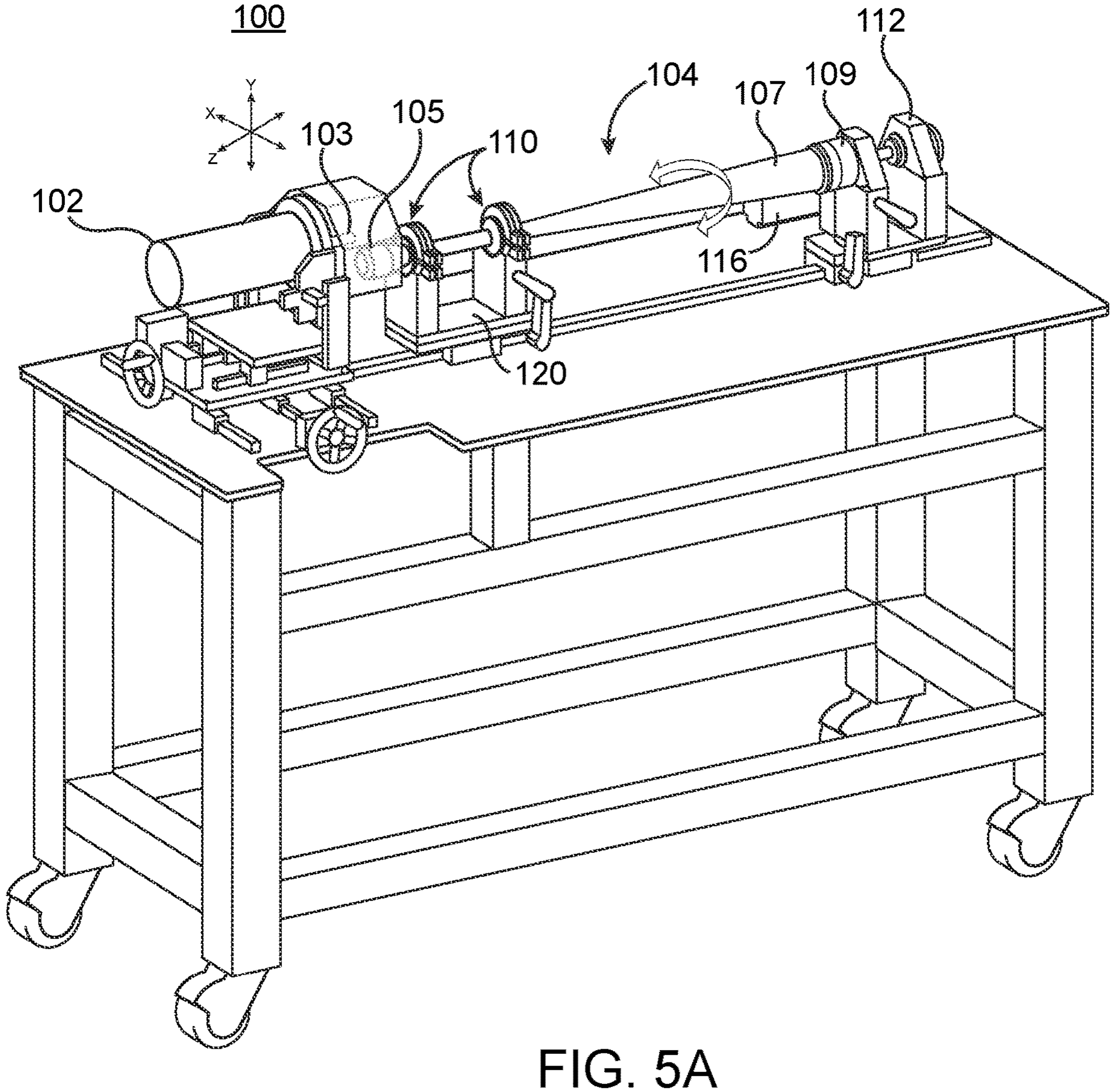
FIG. 5A illustrates a device that modifies features of a wooden bat according to one example of the technology.

FIG. 5A illustrates a device 100 that modifies features of a wooden bat according to one example of the technology. For example, the device 100 may include various implements or tools that modify features of a wooden bat. According to one example, the device 100 may include a cutting tool 102, which includes an attachment 103 that removes material from the baseball bat 104. For example, the cutting tool 102 may include an attachment 103 that removes material from a knob 105 of the bat 104. According to one example, the attachment 103 is configured to rotate or spin to remove material. According to one example, the cutting tool 102 include a router, a dremel tool, a computer numerical control (CNC) lathe, or the like. According to one example, the cutting tool 102 may include interchangeable attachments. According to one example, the device 100 may include a bat support 109 that contacts the barrel 107 such as at the end of the barrel 107. According to one example, the device 100 may include clamps 110 that secure the baseball bat 104 within the device 100. For example, the clamps 110 may secure the baseball bat 104 proximate to the knob 105 or grip area. According to one example, the device 100 may include a rotator 112 that is employed to rotate the baseball bat 104 around an axis that passes through the bat lengthwise. According to one example, a servo motor 116 drives the rotator 112 According to one example, the clamps 110 allow the bat to rotate therein.

Figure 8:
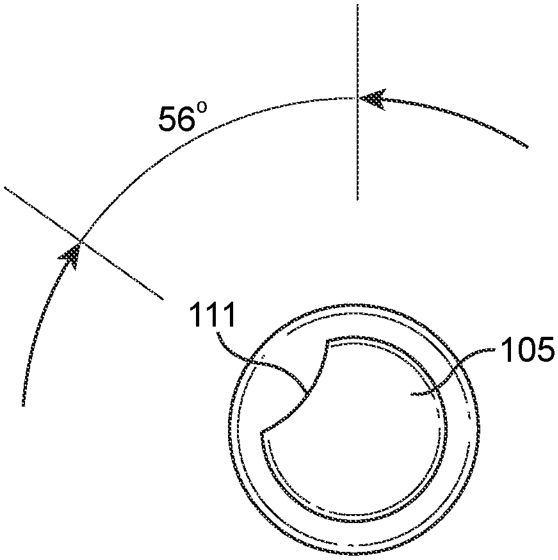
FIG. 8 illustrates a wooden bat positioned with a barrel label facing upwards and material removed from the bat knob, the removed material being positioned at an angle relative to the barrel label according to one example of the technology.
Figure 9:
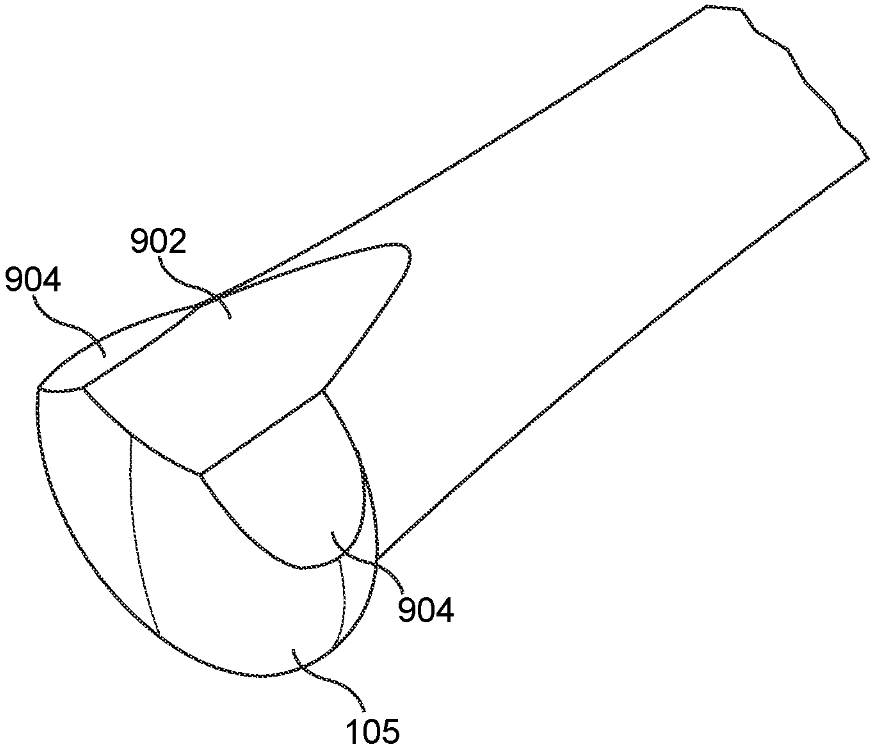
FIG. 9 illustrates a bat with material removed from the bat knob according to another example of the technology.
Figure 10:
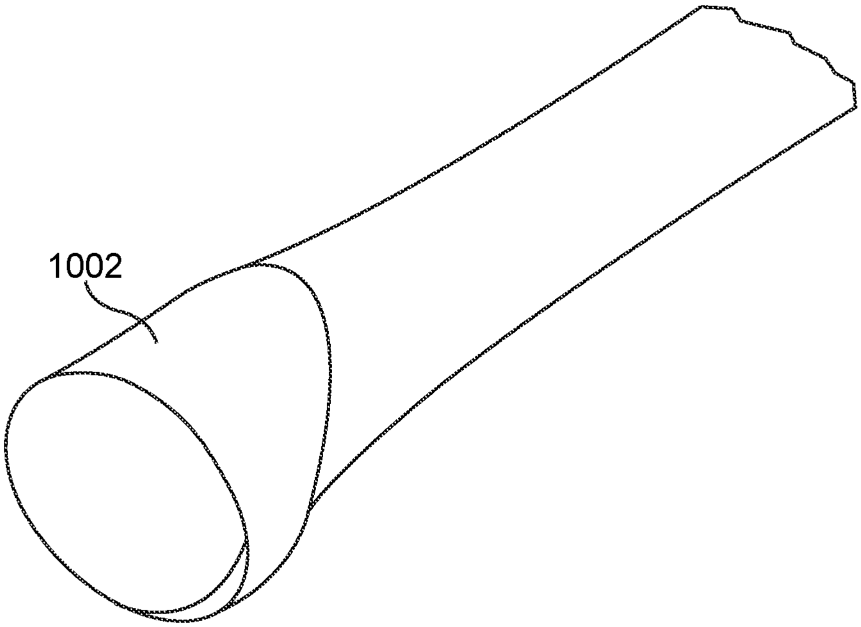
FIG. 10 illustrates a bat with material removed from the bat knob according to yet another example of the technology.

According to one example, the cutting tool 102 may be adjusted in multiple dimensions. For example, the cutting tool 102 may be adjusted in three-dimensions such as x-, y-, z-directions as shown in FIG. 5A. According to one example, the cutting tool 102 may be tilted to provide adjustment in more than three dimensions. For example, the cutting tool 102 may be tilted up, down, left, or right. According to one example, the cutting tool 102 may be adjusted in various dimensions to modify an approach angle of the attachment 103 relative to the baseball bat 104. According to one example, the cutting tool 102 may be adjusted in multiple dimensions to enable the attachment 103 to mechanically remove material from the wooden baseball bat 104. According to one example, the cutting tool 102 may be adjusted in x-, y-, z-directions to enable the attachment 103 to change a geometry of the knob 105. For example, the cutting tool 102 may be employed to enable the attachment 103 to remove material from the knob 105 as shown by the cut or relief 111 illustrated in FIGS. 7 and 8. According to another example, the cutting tool 102 may be employed to enable the attachment 103 to re-shape the knob 105 as desired such as illustrated in FIGS. 9 and 10. According to yet another example, the cutting tool 102 may be employed to enable the attachment 103 to remove the knob 105 altogether. According to one example, the device 100 may include a processor that may be programmed with instructions to perform precise and repeatable steps to remove material from the knob of a wooden baseball bat.

Figure 5B:
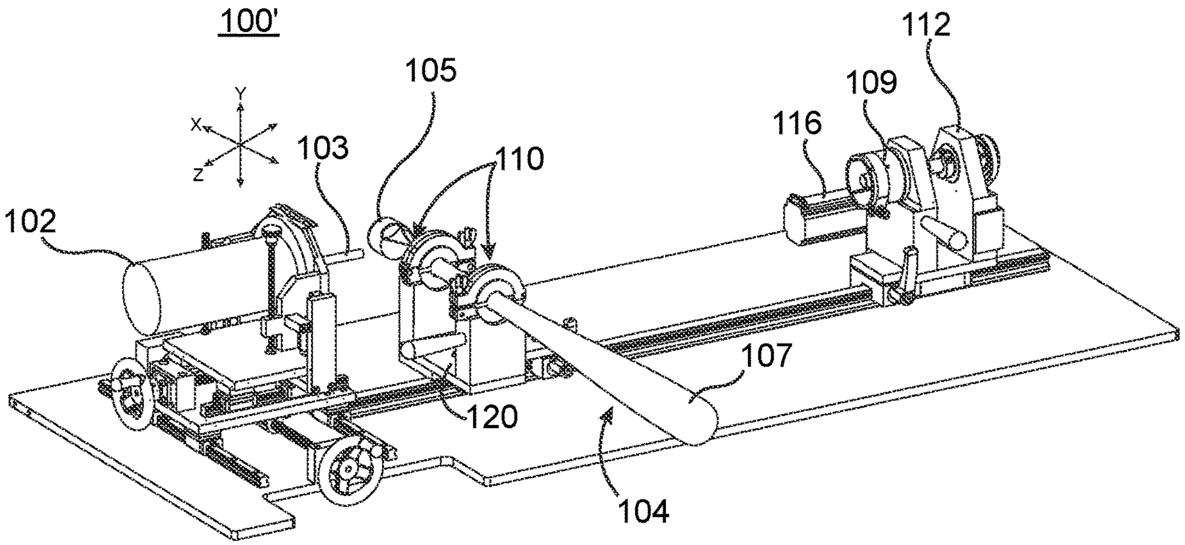
FIG. 5B illustrates a device that modifies features of a wooden bat according to another example of the technology.

FIG. 5B illustrates a device 100' in which the baseball bat 104 is oriented substantially perpendicular to the orientation illustrated in FIG. 5A. According to one example, the clamps 110 may be secured to a base 120 that pivots or swivels. While FIG. 5B illustrates the baseball bat 104 substantially perpendicular to the orientation illustrated in FIG. 5A, the base 120 may be configured to pivot through any angle increment. For example, the base 120 may pivot through any increment between 0 and 360 degrees. However, given the location of the cutting tool 102 relative to the baseball bat 104, the base 120 may be restricted to pivot between 0 and 135 degrees in either direction relative to FIG. 5A. According to one example, the base 120 may pivot to orient the baseball bat 104 between 0 and 90 degrees relative to the cutting tool 102. According to one example, orienting the baseball bat 104 relative to the cutting tool 102 modifies an approach angle of the baseball bat 104 relative to the attachment 103. Still further, the base 120 may be configured to tilt up, down, left, or right to modify an approach angle of the baseball bat 104 relative to the attachment 103. According to one example, an operator may manually rotate the baseball bat 104 within the clamps 110 as desired.

According to one example, the relief 111 in the knob 105 provides clearance to an area of the hand that includes the hamate bone. For example, the relief 111 may be oriented to prevent the hamate bone in the lower hand from contacting the knob 105. According to one example, the relief 111 is positioned on the knob 105 specific to a batter's grip in order to minimize a force exerted by the knob 105 on the hamate bone during a bat swing. According to one example, the decreased knob force will result in fewer fractures of the hamate bone. According to another example, a batter may use the modified bat 104 with the relief 111 during a recovery phase after surgery is performed to remove the fractured hook of the hamate bone. According to one example, the modified bat 104 may allow a batter to swing the modified bat 104 without the surgery site being irritated, as much compared to a bat having a full knob.

The technology provides a method for determining a position, size, and/or shape of the cut or relief 111 that is removed from the knob 105 of the bat 104. According to one example, the relief 111 may be custom fit for each player. According to one example, hitters may orient or rotate wooden bats around the length axis to position the wood grain such that the hardest part will make contact with the baseball. Some wooden bats are made of diffuse core wood such as maple, birch, and beech wood. For diffuse core wooden bats, bat manufacturers place an ink dot on the face grain, which is the hardest part of the bat. Other wooden bats are made from ring bar wood such as Ashe. For ring bar wooden bats, bat manufacturers print a label and/or model number on the weakest or softest part of the bat. These markings assist hitters to properly orient the bat 104. For example, hitters may position the label upward or downward when hitting with ring bar wooden bats. Otherwise, hitters may position an ink dot toward a pitcher or away from the pitcher for diffuse core wooden bats. One of ordinary skill in the art will readily appreciate that a bat has two hard sides and two soft sides that are oriented substantially 180° apart. Thus, hitters may rotate a bat 180° to obtain similar hitting results.

The art of swinging a baseball bat contemplates that each hitter has an individual preference for gripping a bat. Some hitters twist or cock their wrists more or less than other hitters. Accordingly, different portions of the knob 105 may contact the hamate bone of different hitter. In other words, for wooden bats, it is not probable for manufacturers to produce a single bat 104 with a generic relief location that will fit two or more hitters. Instead, wood bat manufacturers must produce bats with a unique or custom relief location for each hitter.

Figure 6A:
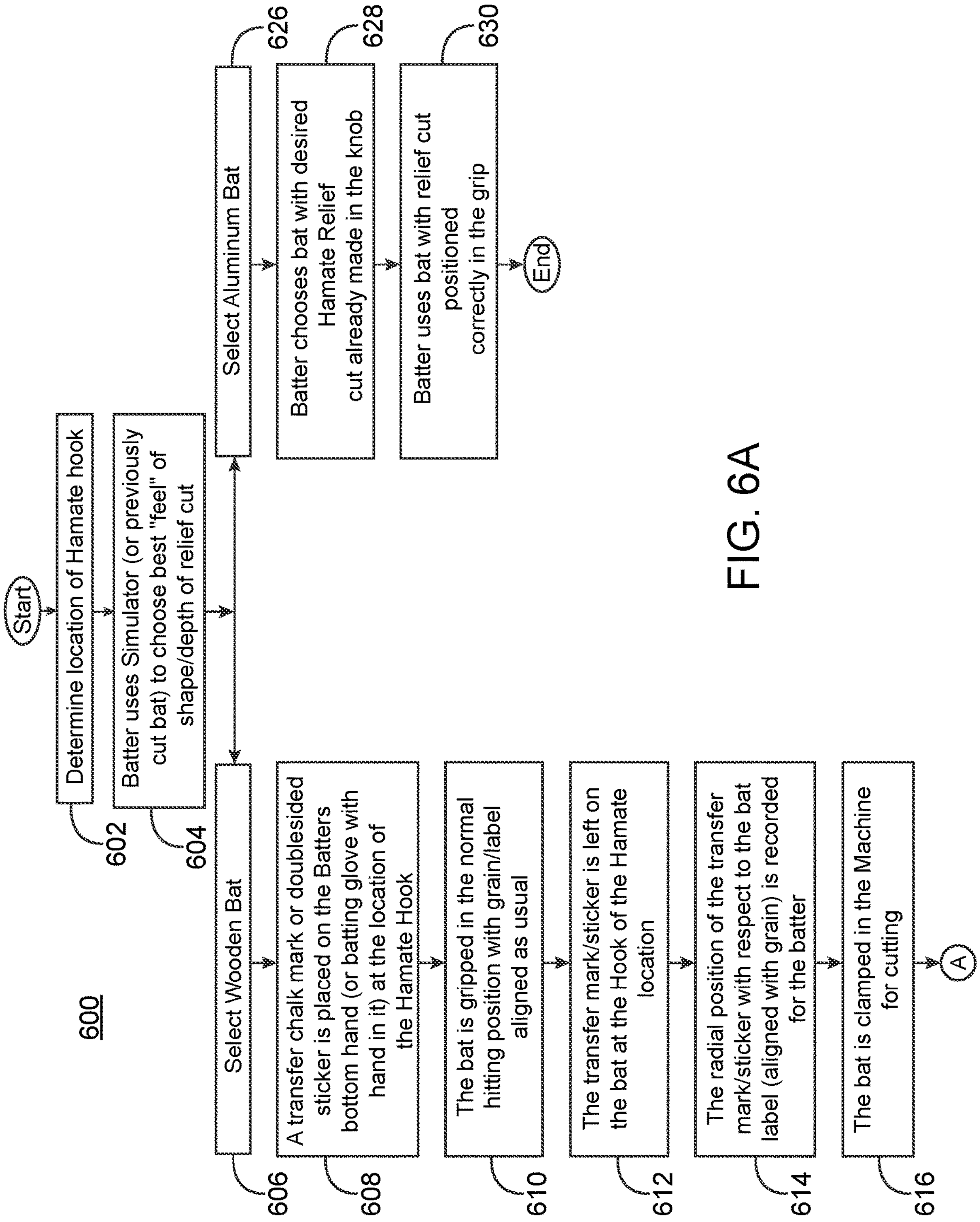
FIG. 6A illustrates a flow chart for removing material from a bat knob according to one example of the technology.
Figure 6B:
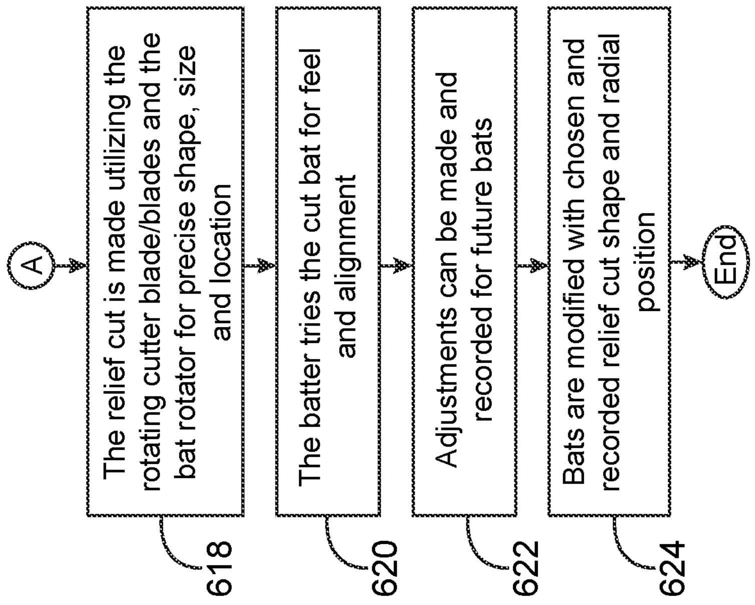
FIG. 6B illustrates a flow chart for removing material from a bat knob according to one example of the technology.
Figure 11:
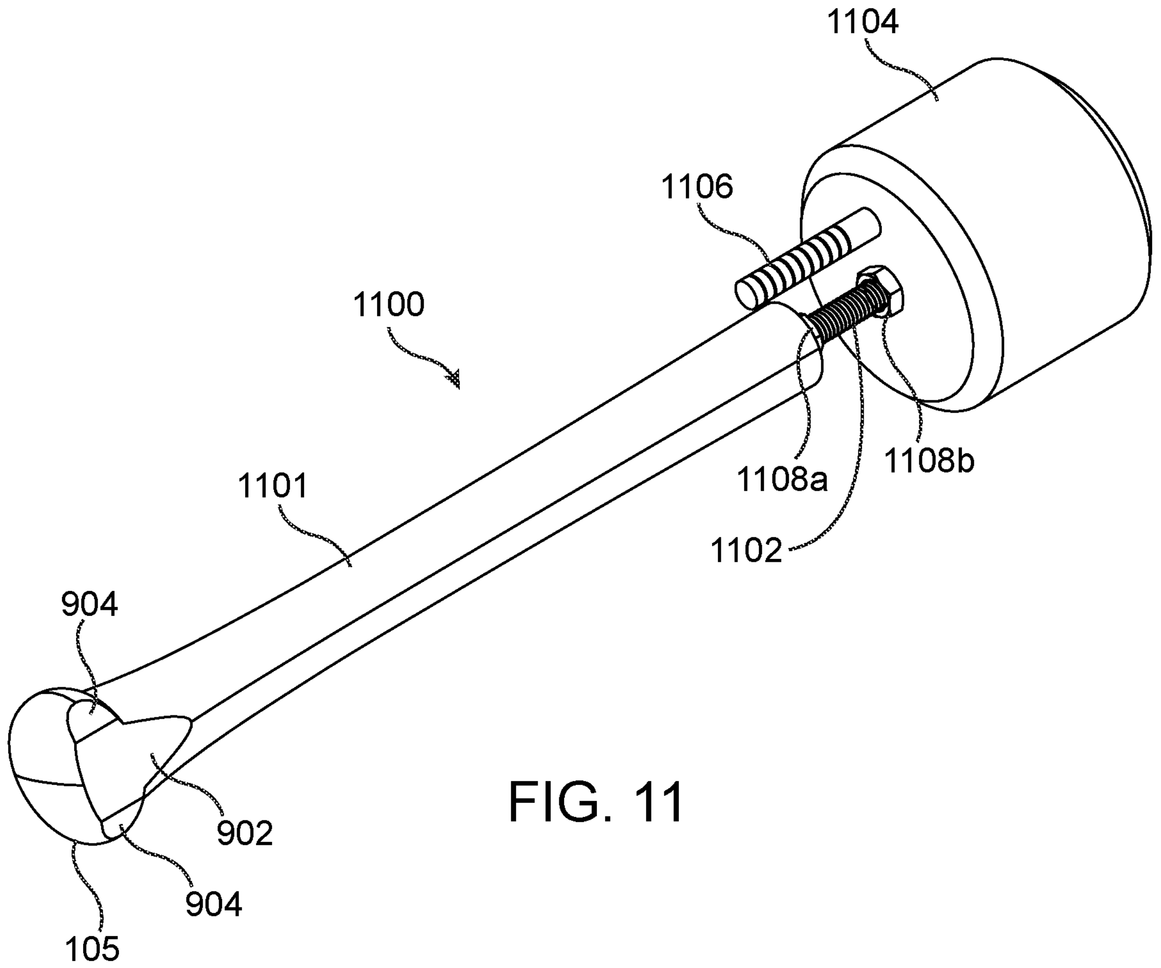
FIG. 11 illustrates a bat simulator according to one example of the technology.

The technology described herein provides a custom relief location on the knob 105 to accommodate for different hitter gripping preference. With reference to FIGS. 1 and 6, the location of a hitter's hamate hook is determined in an operation 602 based on an intersection of the Kaplan's cardinal line and the ulnar border of ring line. In an operation 604, a hitter may employ a simulator, as illustrated in FIG. 11, to select a handle having desired shape and/or depth of a relief or cut that provides a "best feel". For example, a hitter may hold the simulator in a normal grip with the relief 111 placed on the area of the hamate hook of the bottom hand. According to one example, a simulator may include a bat handle having an attached weight, wherein the weight provides a moment of inertia that emulates a feel of swinging a full-size bat. For example, the simulator may include a bat handle that is 12-inches in length with the attached weight that emulates a feel of swinging a full-size bat. According to one example, the simulator may include a handle with a pre-cut knob that includes a particular shape and/or depth. According to one example, the technology contemplates employing different simulators, each with unique pre-cut knob having a particular shape and/or depth. In this way, hitters may sample different simulators to select a bat having a desired handle with a custom relief shape and/or depth that provides a "best feel."

In operation 606, a hitter may select a wooden bat rather than a metal bat. In operation 608, a transfer chalk mark, a double-sided sticker, or the like 101 may be placed on the hitter's bottom hand or palm at the location of the hamate hook. One of ordinary skill in the art will readily appreciate that the transfer chalk mark, the double-sided sticker, or the like may be placed on a batting glove or the like. For example, chalk or some other transferrable substance 101 may be placed on the palm or glove over the hitter's hamate hook. In operation 610, the hitter may grip the bat 104 as if preparing to swing at a pitched baseball. For example, the hitter may grip the bat 104 with the grain or label positioned so the ball would contact the hard side of the bat barrel 107. In operation 612, the mark is transferred to the bat knob 105 to identify where a relief 111 should be created in the knob 105. According to one example, the device 100 may be operated to remove the relief 111 from the knob 105 at the marked location. In operation 614, the position of the relief 111 along the knob 105 may be recorded in a computer memory associated with a specific hitter. In operation 616, the bat 104 may be clamped in the device 100. In operation 618, the device 100 may remove the relief 111 from the knob 105 at the marked location. According to one example, the relief 111 may be removed from the knob 105 in an automated operation. For example, for ring bar wooden bats, a processor may execute instructions to store a hitter's custom grip position as an angular displacement relative to a label position. In contrast, for diffuse core wooden bats, a processor may execute instructions to store a hitter's custom grip position as an angular displacement relative to an ink dot. Alternatively, a hitter's custom grip position may be recorded manually. In operation 620, the hitter may swing the bat 104 with the modified knob to evaluate the feel and alignment of the relief 111. According to one example, a geometry of the relief 111 may be modified as desired to improve the feel. For example, the geometry of the relief 111 may be modified over several cutting operations following evaluations of the "grip feel" of the relief 111 after the material is removed. According to one example, a size and shape of the relief 111 is a preference of the hitter based on a grip feel after the material is removed. In operation 622, different variations of relief size, relief shape, relief location, and the like may be utilized to obtain an optimal feel. In operation 624, after a particular hitter is fitted with a bat 104 having a custom relief 111 positioned along the knob 105, a particular hitter may order multiple bats that include the custom relief 111 provided in a desired location or position along the knob 105, without re-fitting for each bat. According to one example, the technology may employ a manual process or an automated process to accurately position the custom relief 111 along the knob 105 of the bat 104 for specific hitters.

According to one example, hitters may select non-wood materials such as metal for a bat, which is equally strong in all directions. Thus, hitters do not need to orient or rotate metal bats along the length axis to ensure the strong or hard part of the bat will contact the baseball. In other words, batters may hold metal bats in any desired orientation relative to a hitting direction. Metal bats offer an ability for bat manufacturers to position a relief at a pre-selected location in the knob to avoid hamate injury. Batters may rotate the metal bats as desired to align their hamate bone to the relief and accommodate their swing preference. For metal bats, the relief is not required to be custom fit to a knob location according to batter preferences. Rather, the relief may be formed at any location on the knob. Batters may select a size and shape of the relief based on a preferred grip feel. According to one example, the knob may be shaped as desired during manufacture of metal bats. According to one example, metal bats may be manufactured with different variations of relief size and relief shape to provide options for batters to attain an optimal feel. Alternatively, the knob may be omitted during manufacture. One of ordinary skill in the art will readily appreciate that the relief size may be varied to account for different hand sizes and grip preferences. With reference to FIG. 6, the hitter may select a metal bat rather than a wooden bat in operation 626. In operation 628, the hitter may select an metal bat based on the simulator fitting, which includes a pre-cut knob having a particular shape and/or depth. In operation 630, the hitter may use the metal bat with the selected relief in the knob. According to one example, players may grip a baseball bat 104 so that the relief 111 prevents the knob 105 from exerting a direct force against the hamate bone of the contacting hand during a bat swing.

According to one example, the device 100 is configured to modify the bat 104 to provide the relief 111 in the knob 105 in order to minimize injury to the hamate bone. Furthermore, the cutting tool 102 may be employed to cut a pocket in the grip end of the bat 104 to embed a motion sensor therein. For example, a pocket may be cut in the grip end of the bat 104 to embed a Blast® motion sensor therein. Currently, Blast® motion sensors are slipped over the knob 105 using a slip-on rubber piece that remains on an exterior of the bat 104 and may impact a hitter's natural grip preference. According to one example, a motion sensor is employed to track a hitter's swing dynamics and may obtain swing data such as bat speed, bat path/direction, number of swings, or the like. According to one example, providing the relief 111 in the knob 105 may allow the hitter to remain on-plane longer during a swing. In contrast, swinging a bat without a relief cut may cause a hitter to veer off-plane earlier than desired in anticipation of the knob 105 impacting the hamate bone.

Figure 7:
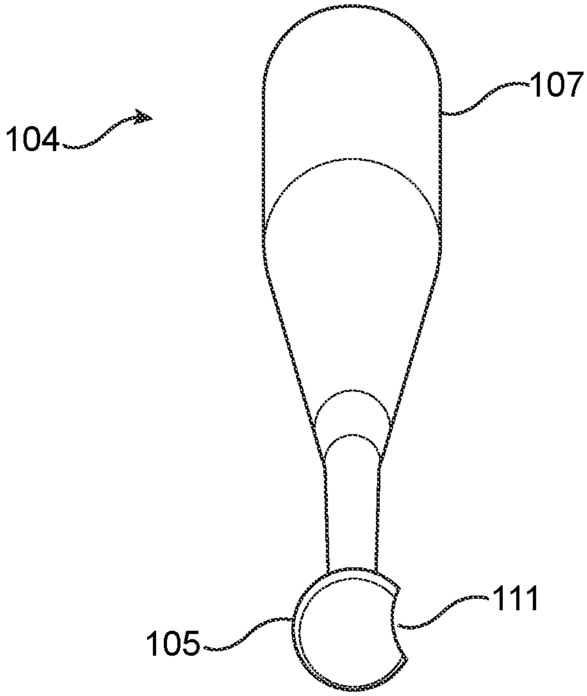
FIG. 7 illustrates a bat with material removed from the bat knob according to one example of the technology.

FIG. 7 illustrates a bat 104 having a relief 111 removed from the knob 105 in the handle. FIG. 8 illustrates that the relief 111 may be oriented a selected number of degrees relative to a bat label. For example, the relief 111 may be oriented 56° counterclockwise relative to a bat label. According to one example, the servo motor 116 is couple to a computer that sends a signal to spin the rotator 112 by 56° counterclockwise relative to a bat label. One of ordinary skill in the art will readily appreciate that the relief 111 may be oriented at other angles relative to the label or other reference point. FIGS. 9 and 10 illustrate alternative relief cuts. For example, FIG. 9 illustrates a flat relief cut 902 with wings 904, while FIG. 10 illustrates an eccentric relief cut 1002. According one to example, the eccentric relief cut 1002 includes removing material around the knob 105 such that a smaller diameter knob is offset from a centerline of the bat 104, away from the hamate. One of ordinary skill in the art will readily appreciate that other relief cuts may be employed.

According to one example, the bat 104 may be supported within the device 100 by a bat support 109 and clamps 110. According to one example, the device 100 may include a rotator 112 that rotates the bat 104. For example, the device 100 may include a rotator 112 that rotates or spins the bat 104 around the length axis under instructions from a computer that controls the motor 116. According to one example, the rotator 112 may rotate the bat 104 by a specific number of degrees around the length axis under instructions from a computer that controls the motor 116. According to one example, the rotator 112 may spin the bat 104 by a specific number of degrees around the length axis under instructions from a computer that controls the motor 116. According to one example, the bat 104 may be initially oriented within the device 100 with a bat label facing upward.

According to one example, bat manufacturers custom fit wooden baseball bats 104 for professional baseball players. Custom fit baseball bats 104 provide optimal "feel", while enhancing player performance. For example, custom fit baseball bats 104 take into account and optimize batter athleticism including strength, speed, and the like. According to one example, custom fit baseball bats 104 improve player performance through improved bat speed, bat control or bat path during a swing, and weight with weight center of gravity positioning, end-loaded vs. handle-loaded, among providing other performance enhancements. According to one example, custom fit baseball bats 104 provide a distinct moment of inertia ("MOI") defined by a weight of the bat multiplied by a distance from the grip location. A proper moment of inertia produces optimal swing results such as best bat speed, highest power based on amount of end-load, and enhanced control determined by flattest bat path.

FIG. 11 illustrates a bat simulator 1100 according to one example of the technology. According to one example, the bat simulator 1100 may include a handle 1101 with a knob 105 that is modified to include a relief cut, a threaded rod 1102, a weight 1104, and a reference post 1106 that is attached to the weight 1104 in the direction of the handle 1101. According to one example, the reference post may include MOI graduation marks. According to one example, the handle 1101 may include a threaded insert that is embedded "on center" into the end of the handle 1101, opposite the knob 105. According to one example, the weight 1104 may include a threaded cavity about a centerline axis. According to one example, the weight 1104 should be symmetrical about the threaded cavity. According to one example, the threaded rod 1102 may be inserted into the threaded insert provided at the end of the handle 1101 and the threaded cavity about the centerline. According to one example, the threaded rod 1102 may be secured to the threaded insert and the threaded cavity using lock nuts 1108*a*,1108*b*. One of ordinary skill in the art will readily appreciate that other fastening mechanisms may be employed to secure the various components of the bat simulator 1100. One of ordinary skill in the art will readily appreciate that other fasteners may be employed to allow adjustment between the various components of the bat simulator 1100.

According to one example, the bat simulator 1100 allows batters to evaluate different handle 1101 and/or knob 105 combinations for optimal "feel," without requiring bat manufacturers to reproduce the various handle 1101 and/or knob 105 combinations in full size, custom fitted bats. According to one example, various bat simulators 1100 may be produced for a particular batter having a same moment of inertia, but different handle shapes and/or relief cut geometries. For example, batters may request bat simulators 1100 with the same moment of inertia, but different relief cut geometries. According to one example, the different relief cut geometries may include different shapes, depths, contours, or the like. Without the bat simulator 1100, bat manufacturers would need to produce various combinations of handle shapes and/or relief cut geometries in knobs 105 for each player in full size, custom fitted bats. The end result is a batter selecting one bat among the many bats and discarding the remainder. This trial and bat selection process is time-consuming and results in tremendous material waste. The bat simulator 1100 eliminates these deficiencies by allowing batters to "feel" different handle and hamate relief cut geometries in a simulator environment. The bat simulators 1100 avoiding the need for bat manufacturers to custom build multiple full size, custom fitted bats.

According to one example, the technology employs multiple bat simulators 1100, each having a different hamate relief geometry cut into the knob 105 and adjusted to provide a same moment of inertia. According to one example, a same moment of inertia is achieved for the multiple bat simulators 1100 by adjusting a distance the weight 1104 is located from the end of the handle. According to one example, the distance the weight 1104 is located from the end of the handle is adjusted by screwing the weight 1104 into or out of the threaded rod 102. One of ordinary skill in the art will readily appreciate that other mechanisms may be employed to adjust a distance between the weight 1104 and the end of the handle. According to one example, adjusting a position of the weight 1104 relative to the end of the handle modifies a moment of inertia of the bat simulator 1100. In this way, the moment of inertia for the bat simulator 1100 may be made to match a moment of inertia of a custom fitted bat. According to one example, the weight 1104, the threaded rod 1102, and the lock nut 1108*b* are configured to move in and out relative to the handle 1101. According to one example, moving these components changes a moment of inertia of the bat simulator 1100.

According to one example, the moment of inertia may be calculated from an end of the handle 1101 proximate to the knob 105. According to one example, the moment of inertia is not dependent on a grip position of the batter. Accordingly, the batter may "choke-up" on the bat simulator 1100 by gripping the handle 1101 away from the knob 105 if hamate relief geometry is not being evaluated. According to one example, the length of the handle 1101 may be dimensioned to 12 inches to allow sufficient room for a batter with large hands to maintain a normal grip. One of ordinary skill in the art will readily appreciate that the handle 1101 may be any length dimension. According to one example, a total mass of the weight 1104, the reference post 1106, and lock nuts 1108*a*,1108*b* remain constant for the bat simulator 1100. According to one example, the weight 1104, the reference post 1106, and lock nut 1108*b* may be moved a selected distance from the end of the handle 1101 to produce different moments of inertia.

According to one example, a mass properties measurement of a three-dimensional ("3D) model of a wooden bat was performed to provide a center of gravity position along the lengthwise axis of the bat 104. According to one example, this center of gravity position corresponds to an actual position of the center of gravity of an actual full-size wooden bat with identical dimensions. Another mass properties measurement with a 3D model of the bat simulator revealed a precise location to position a weight having a pre-determined material, size, and shape. For example, the 3D model may determine the weight should be positioned approximately 14 inches away from the end of the knob 105 to obtain a desired moment of inertia. According to one example, a position of the weight 1104 is adjusted by threading the weight 1104 slightly into or out of the threaded rod 1102.

According to one example, the reference post 1106 includes marks that identify different moments of inertia. For example, moments of inertia may be expressed in units of pound-foot-second-squared (lbf. ft. $s^2$). The technology may determine or discover a range of moments of inertia for relevant baseball players. For example, the range of moments of inertia for relevant baseball players may extend from 30-80 lbf. ft. $s^2$. For purposes of simplification, the range covering 50 lbf. ft. $s^2$ may be converted to a scale of 1 to 100 marks on the reference post 1106. Thus, a player that prefers a moment of inertia of 30 lbf. ft. $s^2$ may correlate to mark 1 provided on the reference post 1106; a player that prefers a moment of inertia of 55 lbf. ft. $s^2$ may correlate to mark 50 provided on the reference post 1106; a player that prefers a moment of inertia of 80 lbf. ft. $s^2$ may correlate to mark 100 provided on the reference post 1106; and so on. According to one example, the reference post 1106 is used to "mark" a final position of the weight 1104 relative to an end of the handle. For example, for a player that prefers a moment of inertia of 55 lbf. ft. $s^2$, the weight 1104 may be rotated on the threaded rod 1102 until the mark 50 provided on the reference post 1106 aligns with the end of the handle 1101 proximate to the weight 1104. One of ordinary skill in the art will appreciate that other techniques may be employed to simplify the process of properly positioning the weight 1104 away from the end of the handle 1101 to obtain a desired moment of inertia.

Returning to the 3D model, the weight 1104 is designed to represent a mass of a bat barrel. According to one example, the dimension of the weight 1104 may be 4 inches long, while the dimension of the bat barrel may be 22 inches calculated from the end of the handle to the tip of the barrel. The moment of inertia is calculated by mass multiplied by distance. Since the dimension of the weight 1104 spans less physical distance than the dimension of the barrel, a total mass of the weight 1104, the reference post 1106, and the lock nut 1108*b* is increased compared to the mass of the relevant portion of the wooden bat barrel. To be clear, if the weight 1104 and the corresponding bat barrel shared similar dimensions, both would be made to have similar mass. According to one example, the weight 1104 includes mass and dimensions that allow the position of the weight 1104 along the threaded rod 1102 to cover a range of minimum and maximum wooden bat lengths allowed by Major League Baseball.

During an operation of adjusting the bat simulator 1100, the lock nut 1108*a* on the threaded rod 1102 proximate to the handle 1101 is maintained tight to ensure stability. The lock nut 1108*b* on the threaded rod 1102 proximate to the weight 1104 is loosened to allow the weight 1104 to be adjusted in or out along the threaded rod 102. According to one example, the weight 1104 is screwed in or out along the threaded rod 102 so that a marked graduation on the reference post 1106 aligns with the end of the handle 1101. According to one example, the marked graduation on the reference post 1106 corresponds to a custom fitted bat moment of inertia for a batter. Once adjusted, the lock nut 1108*b* is tightened against the weight 1104 for stability. Following this adjustment, the batter may swing the simulator 1100 gripped appropriately on the handle 1101 to obtain a "feel" for how a particular hamate relief geometry would "feel" on a custom fitted bat.

According to one example, a radial position of the relief cut on the knob 105 is not relevant for the bat simulator 1100 because grain orientation is not important when no contact is made with a baseball. However, the hamate relief cut must be held in a proper position relative to the grip to obtain a proper "feel" determination. According to one example, if the weight 1104 is positioned correctly on the bat simulator 1100 to match the moment of inertia for a custom fitted bat, the batter could close their eyes and not "feel" a difference between a custom fitted bat and the bat simulator 1100 during a dry swing, with no ball contact. One of ordinary skill in the art will appreciate that the bat simulator 1100 may be employed to sample different handle and knob combinations, shapes and sized, without a hamate relief cut.

From the foregoing it will be appreciated that, although specific examples are described herein for purposes of illustration, various modifications may be made without deviating from the spirit and scope of this disclosure. For example, the methods, techniques, and systems for including a relief in the knob of baseball bats are applicable to other settings.

While the preferred example of the technology is illustrated and described, as noted above, many changes can be made without departing from the spirit and scope of the invention. Accordingly, the scope of the invention is not limited by the disclosure of the preferred example.

What is claimed is:

1. A method of determining a relief location for a knob of a baseball bat having a handle configured to be gripped with two hands, one above the other, with a lower hand being proximate to or contacting the knob, comprising: determining a location of a hamate hook on the lower hand, based on an intersection of a Kaplan's cardinal line and an ulnar border of ring line; placing a transferable substance configured to cover over the hook of hamate of the lower hand; selecting a wooden baseball bat; gripping the baseball bat with the grain positioned for a baseball to contact a hard side of a barrel during a swing; and identifying a location to create a relief in the knob using a device, based on a transfer of the substance corresponding to a location of the hamate hook, and cutting and removing material from the knob at the identified location to create the relief.

2. The method of claim 1, further comprising: holding a simulator in a normal grip with the knob placed on the area of the hamate hook of the lower hand; selecting a desired shape of the relief, and selecting a desired depth of the relief.

3. The method of claim 2, wherein the material removed corresponds to the selected desired shape and depth.

4. The method of claim 1, further comprising recording a radial position of the identified location to create the relief in the knob.

5. The method of claim 4, further comprising clamping the baseball bat in the device to remove the material from the knob.

6. The method of claim 5, further comprising removing the material from the knob at the recorded radial position.

7. The method of claim 6, further comprising evaluating a feel and alignment of the relief at the recorded radial position.

8. The method of claim 7, further comprising modifying a geometry of the relief at the recorded radial position.

9. The method of claim 8, further comprising ordering multiple baseball bats with the modified geometry of the relief at the recorded radial position.

10. A method of determining a relief location for a knob of a baseball bat having a handle configured to be gripped with two hands, one above the other, with a lower hand being proximate to or contacting the knob, comprising:

determining a location of a hamate hook on the lower hand, based on an intersection of a Kaplan's cardinal line and an ulnar border of ring line; placing a double-sided sticker configured to cover over the hook of hamate of the lower hand; selecting a wooden baseball bat; gripping the baseball bat for a baseball to contact a hard side of a barrel during a swing; and identifying a location to create a relief in the knob using a device, based on a transfer of the double-sided sticker corresponding to a location of the hamate hook, and cutting and removing material from the knob at the identified location to create the relief.

11. The method of claim 10, further comprising: holding a simulator in a normal grip with the knob placed on the area of the hamate hook of the lower hand; selecting a desired shape of the relief; and selecting a desired depth of the relief.

12. The method of claim 11, wherein the material removed corresponds to the selected desired shape and depth.

13. The method of claim 10, further comprising recording a radial position of the identified location to create the relief in the knob.

14. The method of claim 13, further comprising clamping the baseball bat in the device to remove the material from the knob.

15. The method of claim 14, further comprising removing the material from the knob at the recorded radial position.

16. The method of claim 15, further comprising evaluating a feel and alignment of the relief at the recorded radial position.

17. The method of claim 16, further comprising modifying a geometry of the relief at the recorded radial position.

18. The method of claim 17, further comprising ordering multiple baseball bats with the modified geometry of the relief at the recorded radial position.

* * * * *